UNITED STATES PATENT OFFICE.

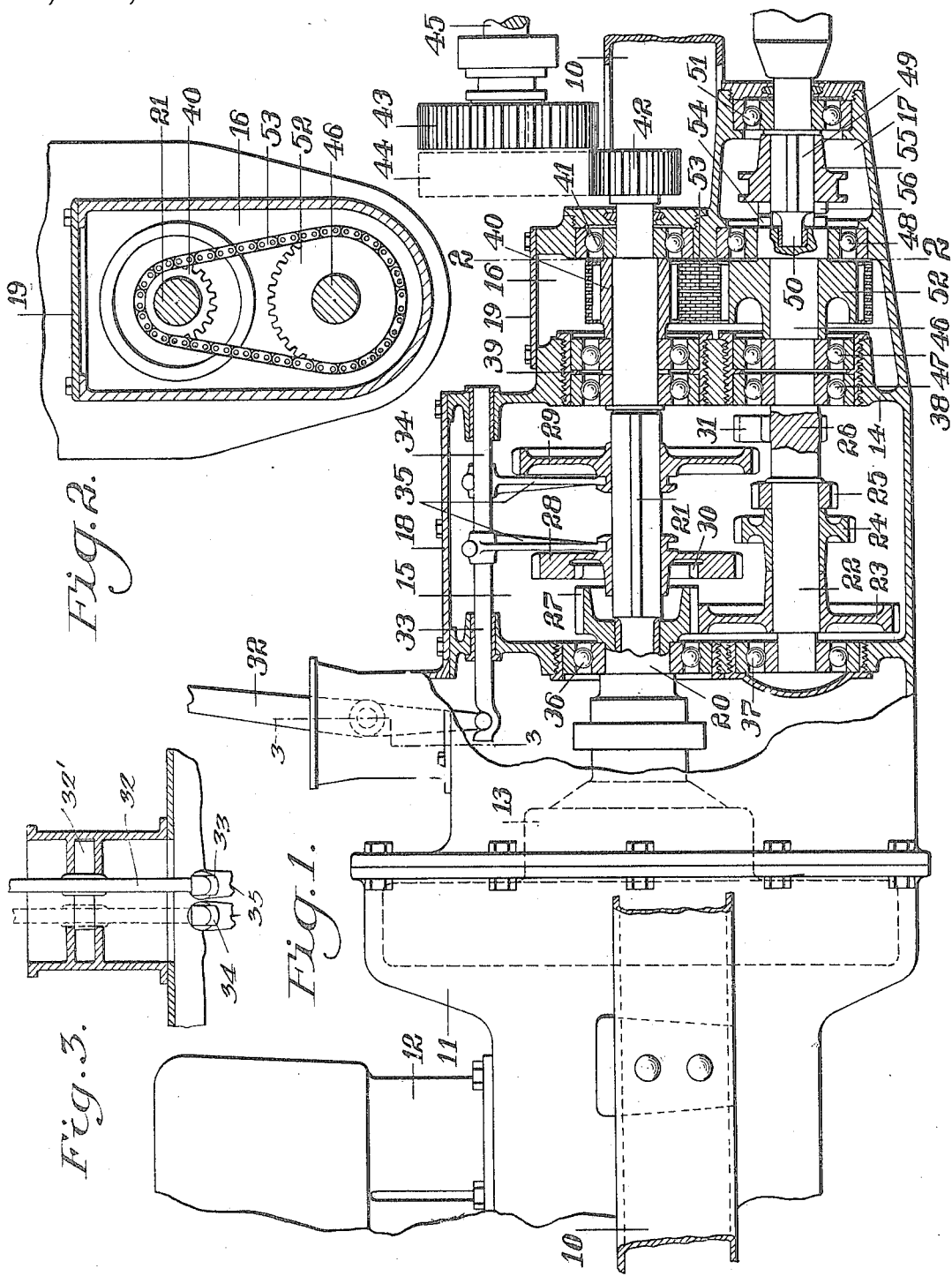

ALLEN LOOMIS, OF DETROIT, MICHIGAN, ASSIGNOR TO PACKARD MOTOR CAR COMPANY, OF DETROIT, MICHIGAN, A CORPORATION OF MICHIGAN.

GEARING.

1,207,951.	Specification of Letters Patent.	Patented Dec. 12, 1916.

Application filed November 23, 1912. Serial No. 733,132.

*To all whom it may concern:*

Be it known that I, ALLEN LOOMIS, a citizen of the United States, and resident of Detroit, Wayne county, State of Michigan, have invented certain new and useful Improvements in Gearing, of which the following is a specification.

This invention relates to motor vehicles, and particularly to the gearing and driving mechanism thereof.

The invention is particularly adapted for use in commercial vehicles or trucks, in which considerable reduction in speed is required between the crank shaft of the motor and the driving wheels, and in which it is desired to operate an auxiliary mechanism at various speeds from one of the operating shafts of the gear mechanism.

One of the objects of the invention is the production of a motor vehicle in which there is a constant speed reduction between the driven shaft of the gear box and the transmission or propeller shaft.

Another object of the invention is the production of a compact driving mechanism having the above characteristics and in which the lay shaft of the gear box is alined or coaxially arranged in relation to the transmission shaft.

Another object of the invention is to provide a motor vehicle gearing in which the end of the alined driven shaft of the gear box may be provided with a gear or pinion for the purpose of operating an auxiliary mechanism, such as a windlass.

Other objects of the invention will appear from the following description, taken in connection with the drawings which form a part of this specification, and in which, Figure 1 is a side elevation of the central part of a motor vehicle with parts broken away and showing the gear box and driving mechanism in vertical section; Fig. 2 is a transverse section approximately on the line 2—2 of Fig. 1; and Fig. 3 is a vertical section approximately on the line 3—3 of Fig. 1.

Referring to the drawings, 10 represents one of the side bars of a motor vehicle frame, upon which the power plant 11 is mounted. The power plant in this instance consists of the motor 12, the clutch 13 and the gear casing 14. The gear casing is shown as divided into several compartments, the front compartment 15 housing the change speed gears, the central compartment 16 housing the constant reduction mechanism, and the rear compartment 17 housing the transmission shaft clutch. The casing is further suitably provided with covers 18 and 19 and with bearings for supporting the various shafts, hereinafter described.

The crank shaft of the motor 12 is connected with the driving shaft 20 of the gearing through the clutch 13 and the driven shaft 21 is mounted axially or in line therewith. A lay shaft 22 is also mounted in the gear box, parallel with the shafts 20 and 21, and it is provided with gears 23, 24, 25 and 26. On the shaft 20 is an integral gear 27, which constantly meshes with the gear 23 for driving the lay shaft 22. The driven shaft 21 is shown as being square in cross section, and sliding thereon are gears 28 and 29. The gear 28 is provided with internal clutch teeth 30, which are adapted to clutch with the teeth of gear 27 and thereby cause the driven shaft 21 to be driven directly or at the same speed as shaft 20. By sliding the gear 28 rearwardly, it will mesh with gear 24 on the lay shaft, and shaft 21 will then be driven at a reduced speed from shaft 20. By sliding the gear 29 forwardly, it will mesh with gear 25, and shaft 21 will thereby be driven at a still greater reduction in speed from shaft 20. By sliding the gear 29 rearwardly, it will be caused to mesh with a reverse pinion 31, which pinion is suitably mounted in the gear box in constant mesh with the gear 26, and the shaft 21 will then be driven at a reduced speed and in a reverse direction from the shaft 20. It will be noted that gears 28 and 29 may be shifted, as above set forth, by the shift lever 32 through rods 33 and 34 and yokes 35. The lever 32 is trunnioned as at 32' and may be moved laterally on its trunnions into either of the two positions shown in full and dotted lines respectively in Fig. 3, for the purpose of selecting the desired shifter rod 33, 34, and then rocked on its trunnions to move the selected shifter rod to shift the sliding gear in the well-known manner.

The above shafts are shown as mounted in bearings 36, 37, 38 and 39, and the shaft 21 extends through the bearing 39 and into compartment 16, where it is provided with a sprocket 40. This shaft also extends through the rear wall of the compartment 16, being mounted therein in a bearing 41, and its projecting end is provided with a gear 42, which is adapted to mesh with a sliding gear 43, shown in the drawing as being in inoperative position. The operative position of this gear is indicated in dotted lines at 44.

It will be understood that the gear 43 is adapted to be connected through its shaft 45 with an auxiliary mechanism, such as a windlass or other device, to be used at intervals on the vehicle, whereby the manual operation of such device is dispensed with and the motor substituted as the power for operating the mechanism. By connecting the gear 43 with the shaft 21, as shown herein, the mechanism operated by the shaft 45 may be driven at various speeds through the gearing in the compartment 15.

A transmission shaft 46 is also mounted in the compartment 16, and it is shown as in alinement with the lay shaft 22, so that its forward bearing 47 is mounted contiguous to the bearing 38, above referred to. Its rear bearing 48 is mounted in the rear wall of the compartment 16, and a shaft 49 has its forward end mounted in a plain bearing 50 in the shaft 46. The shaft 49 extends through the rear wall of the compartment 17, and is mounted in a bearing 51 therein, this shaft forming the propeller shaft of the vehicle, and connecting with the driving wheels thereof. The transmission shaft 46 is provided with a sprocket 52, somewhat larger than the sprocket 40, and a chain 53, preferably of the silent type, connects the sprockets 40 and 52, so that the shaft 46 is constantly connected with the shaft 21 and driven thereby at a reduced speed. The rear end of the shaft 46 is formed with clutch teeth 54, and a collar 55 sliding on the square portion of the shaft 49 is provided with similar teeth 56, so that the shaft 46 may be clutched to the shaft 49 for driving the latter direct.

It will be understood that with the vehicle standing, the shaft 49 may be disconnected from the shaft 46 through the clutch teeth 54—56, and the gear 43 may be moved into operative relation with the gear 42 for operating the auxiliary mechanism. When it is desired to use the motor again for driving the vehicle, the gear 43 is moved to inoperative position and the clutch 54—56 again engaged.

A specific embodiment of the invention has been described in detail, which embodiment is deemed to be new and advantageous, and will be specifically claimed, but it should be understood that the invention is not limited to the exact details of construction shown, as it will be apparent that changes may be made without departing from the spirit and scope of the invention.

Having thus described my invention, what I claim and desire to secure by Letters Patent, is:

1. In a motor vehicle, the combination with the alined driving and driven shafts, and gearing connecting said shafts to operate the driven shaft at various speeds relative to the driving shaft, of a transmission shaft out of line with the driven shaft, driving mechanism constantly connecting the driven shaft with said transmission shaft, and a second driving connection on said driven shaft.

2. In a motor vehicle, the combination with the alined driving and driven shafts, and gearing connecting said shafts to operate the driven shaft at various speeds relative to the driving shaft, of a transmission shaft out of line with the driven shaft, chain mechanism for driving the transmission shaft from the driven shaft at a reduced speed, and a second driving connection on the driven shaft beyond said chain mechanism.

3. In a motor vehicle, the combination with alined driving and driven shafts, a lay shaft, and gears on said shafts for driving the driven shaft at a plurality of different speeds relative to the driving shaft, of a transmission shaft alined with said lay shaft, and speed reducing gearing between the driven shaft and the transmission shaft.

4. In a motor vehicle, the combination with alined driving and driven shafts, a lay shaft, and gears on said shafts for driving the driven shaft at a plurality of different speeds relative to the driving shaft, of a transmission shaft out of line with said driven shaft, chain driving mechanism between said transmission and driven shafts, and a gear on said driven shaft beyond the chain mechanism.

5. In a motor vehicle, the combination with alined driving and driven shafts, a lay shaft, and gears on said shafts for driving the driven shaft at a plurality of different speeds relative to the driving shaft, of a transmission shaft out of line with said driven shaft, driving mechanism between said driven shaft and said transmission shaft, a shaft alined with said transmission shaft, a detachable coupling mechanism between said two latter shafts, and a mechanism adapted to be connected to, and disconnected from, said driven shaft.

6. In a motor vehicle, the combination with alined driving and driven shafts, and three alined shafts arranged parallel with said driving and driven shafts, of gears between one of said three alined shafts and the driving and driven shafts for operating the latter shaft at a plurality of different speeds relative to the driving shaft, speed reducing gearing between said driven shaft and another of said three alined shafts, and a clutch mechanism between said latter alined shaft and the third alined shaft.

7. In a motor vehicle, the combination with the alined driving and driven shafts, and gearing connecting said shafts to operate the driven shaft at various speeds relative to the driving shaft, of a transmission shaft out of line with the driven shaft, driving mechanism connecting the driven shaft with said transmission shaft, and a second driving connection on said driven shaft separate from said driving mechanism.

8. In a motor vehicle, the combination with the alined driving and driven shafts, and gearing connecting said shafts to operate the driven shaft at various speeds relative to the driving shaft, of two independent shafts, and driving mechanism for connecting the driven shaft either separately or simultaneously to said independent shafts.

9. In a motor vehicle, the combination with the alined driving and driven shafts, and gearing connecting said shafts to operate the driven shaft at various speeds relative to the driving shaft, of a transmission shaft out of line with the driven shaft, driving mechanism constantly connecting the driven shaft with said transmission shaft, two independent shafts, a driving connection between the driven shaft and one of said independent shafts, and a second driving connection between said transmission shaft and the other said independent shaft, said driving connections being operable to permit separate or simultaneous driving of said independent shafts.

In testimony whereof I affix my signature in the presence of two witnesses.

ALLEN LOOMIS.

Witnesses:
BERNARD NAGEWOORT,
JOHN D. WILSON.